(12) United States Patent
Takenaka et al.

(10) Patent No.: US 10,883,301 B2
(45) Date of Patent: Jan. 5, 2021

(54) CONTROL APPARATUS CONTROLLING OPENING AND CLOSING MEMBER FOR VEHICLE

(71) Applicant: Aisin Seiki Kabushiki Kaisha, Kariya (JP)

(72) Inventors: Tomoyuki Takenaka, Obu (JP); Takeshi Nishikibe, Tokai (JP); Kohei Kobayashi, Ichinomiya (JP); Noriyuki Kamiya, Chita-gun (JP); Wataru Watanabe, Anjo (JP); Naoki Sugito, Nagoya (JP)

(73) Assignee: AISIN SEIKI KABUSHIKI KAISHA, Kariya (JP)

(*) Notice: Subject to any disclaimer, the term of this patent is extended or adjusted under 35 U.S.C. 154(b) by 184 days.

(21) Appl. No.: 16/170,193

(22) Filed: Oct. 25, 2018

(65) Prior Publication Data

US 2019/0145147 A1 May 16, 2019

(30) Foreign Application Priority Data

Nov. 10, 2017 (JP) ................................. 2017-217586

(51) Int. Cl.
| | | |
|---|---|---|
| B60R 22/00 | (2006.01) | |
| E05F 15/00 | (2015.01) | |
| G05D 1/00 | (2006.01) | |
| G05D 3/00 | (2006.01) | |
| G06F 7/00 | (2006.01) | |
| G06F 17/00 | (2019.01) | |
| E05F 15/659 | (2015.01) | |
| H02P 23/18 | (2016.01) | |
| E05F 15/08 | (2006.01) | |
| E05F 15/16 | (2006.01) | |

(52) U.S. Cl.
CPC ............ *E05F 15/659* (2015.01); *H02P 23/18* (2016.02); *E05Y 2900/531* (2013.01)

(58) Field of Classification Search
CPC ......... E05F 15/659; E05F 15/14; E05F 15/18; H02P 23/18; E05Y 2900/531; B60J 5/06
USPC ............................................... 701/49; 49/349
See application file for complete search history.

(56) References Cited

U.S. PATENT DOCUMENTS

2014/0245666 A1* 9/2014 Ishida ................... E05F 15/655
49/349

FOREIGN PATENT DOCUMENTS

JP 2002-242533 8/2002

* cited by examiner

*Primary Examiner* — Mahmoud S Ismail
(74) *Attorney, Agent, or Firm* — Oblon, McClelland, Maier & Neustadt, L.L.P.

(57) ABSTRACT

A control apparatus controlling an opening and closing member for a vehicle, the control apparatus includes a control signal output portion configured to output a motor control signal, and an advance angle value set portion configured to set an advance angle value, the advance angle value being for advancing a phase of the motor control signal when an assist opening and closing operation is performed. The control apparatus is configured to perform the automatic opening and closing operation which causes an opening and closing member to open and close automatically with driving force of the motor, and the assist opening and closing operation which causes the opening and closing member to open and close in such a manner that the driving force of the motor assists a manual operation force applied to the opening and closing member.

4 Claims, 5 Drawing Sheets

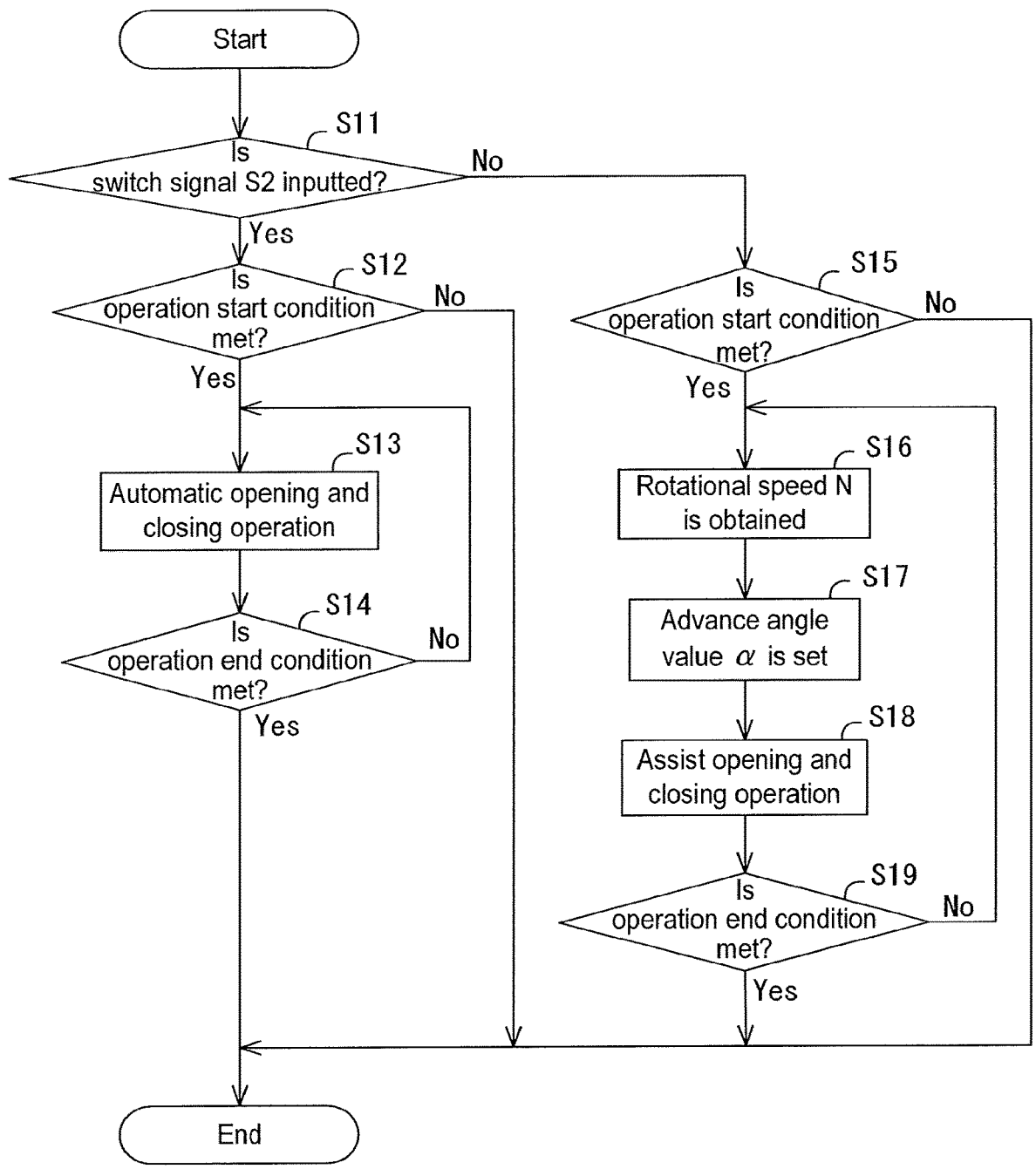

CONTROL APPARATUS CONTROLLING OPENING AND CLOSING MEMBER FOR VEHICLE

CROSS REFERENCE TO RELATED APPLICATIONS

This application is based on and claims priority under 35 U.S.C. § 119 to Japanese Patent Application 2017-217586, filed on Nov. 10, 2017, the entire content of which is incorporated herein by reference.

TECHNICAL FIELD

This disclosure generally relates to a control apparatus controlling an opening and closing member for a vehicle.

BACKGROUND DISCUSSION

As an example of a known control apparatus controlling an opening and closing member for a vehicle, a drive apparatus for an electric slide door is described in JP2002-242533A (which will be hereinafter referred to as Patent reference 1). The known drive apparatus for an electric slide door drives a motor, and automatically opens and closes a slide door (opening and closing member) by an operation of, for example, an in-vehicle operation switch and a portable operation switch. In a case where the known drive apparatus detects that a user has applied an opening and closing operation force to a door handle of the slide door that is performing an automatic opening and closing operation, the drive apparatus increases a duty ratio of the motor and increases a moving speed of the slide door. That is, the known drive apparatus enables the slide door to automatically open and close (automatic opening and closing operation) with only a driving force of the motor, and to open and close at a high speed (assist opening and closing operation) with the opening and closing operation force of the user and the driving force of the motor.

The above-described known drive apparatus deals with changes of the driving speed of the slide door only by changing the duty ratio of the voltage applied to the motor. Thus, according to the above-described known drive apparatus, a motor which includes a performance enough to respond to the changes of the moving speed of the slide door needs to be chosen. In other words, a range in which the moving speed of the slide door can be changed is influenced by the performance of the motor.

A need thus exists for a control apparatus controlling an opening and closing member for a vehicle, which is not susceptible to the drawback mentioned above.

SUMMARY

According to an aspect of this disclosure, a control apparatus controlling an opening and closing member for a vehicle includes a control signal output portion configured to output a motor control signal. The motor control signal is for supplying driving electric power to a motor. The control apparatus includes an advance angle value set portion configured to set an advance angle value. The advance angle value is for advancing a phase of the motor control signal when an assist opening and closing operation is performed as compared to when an automatic opening and closing operation is performed. The control apparatus is configured to perform the automatic opening and closing operation which causes an opening and closing member of a vehicle to open and close automatically with driving force of the motor, and the assist opening and closing operation which causes the opening and closing member to open and close in such a manner that the driving force of the motor assists a manual operation force applied to the opening and closing member.

BRIEF DESCRIPTION OF THE DRAWINGS

The foregoing and additional features and characteristics of this disclosure will become more apparent from the following detailed description considered with the reference to the accompanying drawings, wherein:

FIG. 6 is a flowchart indicating a flow of processing that a door ECU executes to perform an automatic opening and closing operation or an assist opening and closing operation, according to the embodiment.

DETAILED DESCRIPTION

Figure 1:
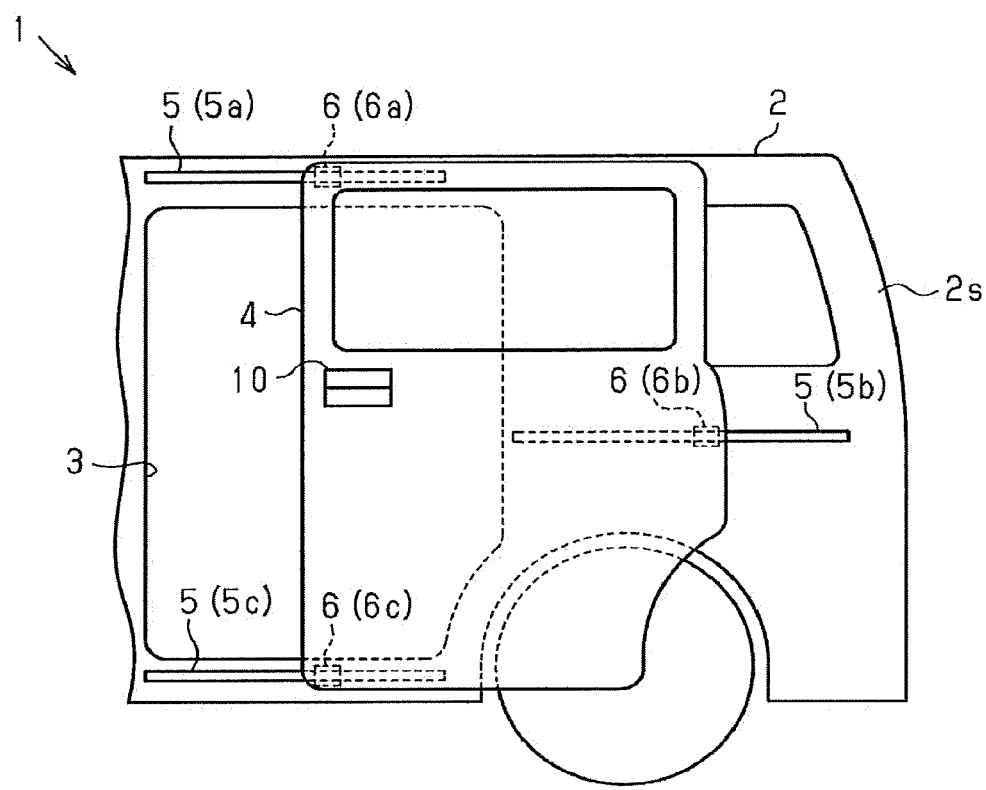
FIG. 1 is a side view illustrating a schematic configuration of a vehicle configured to include a control apparatus controlling an opening and closing member for a vehicle according to an embodiment disclosed here.

A vehicle provided with a control apparatus controlling an opening and closing member for a vehicle according to an embodiment will be described with reference to the drawings. As illustrated in FIG. 1, a vehicle 1 includes a slide door 4 opening and closing a door opening portion 3 provided at a side surface 2s of a vehicle body 2. Specifically, the vehicle 1 includes plural guide rails 5 (5a, 5b and 5c) extending in a vehicle front and rear direction and plural guide roller units 6 (6a, 6b and 6c) connected to the plural guide rails 5. In the embodiment, three of the guide rails 5 and three of the guide roller units 6 are provided, for example. The slide door 4 is supported at the side surface 2s of the vehicle body 2 via the guide rails 5 and the guide roller units 6. The guide rails 5 and the guide roller units 6 are configured such that engagement positions of the guide roller units 6 relative to the corresponding guide rails 5 are changed along an extension direction of the guide rails 5. In the above-described manner, the slide door 4 moves in the vehicle front and rear direction in a state where the slide door 4 moves along the side surface 2s of the vehicle body 2.

As the slide door 4 moves in the vehicle front direction, the slide door 4 comes to be in a fully closed state in which the slide door 4 closes the door opening portion 3. As the slide door 4 moves in the vehicle rear direction, the slide door 4 comes to be in in a fully open state in which an occupant of the vehicle 1 can ingress to and egress from the vehicle 1 via the door opening portion 3.

Figure 2:
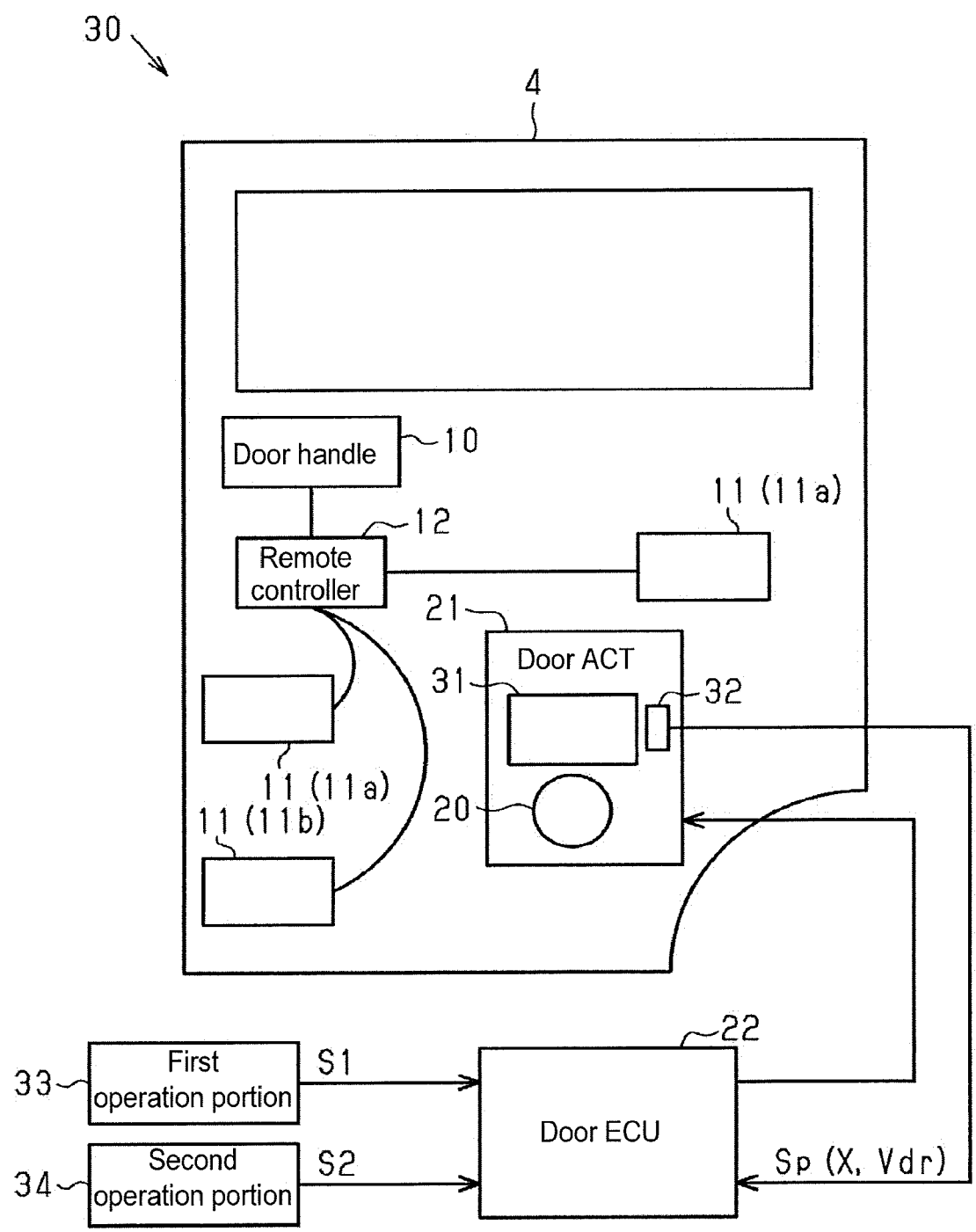
FIG. 2 is a schematic view illustrating a schematic configuration of a power slide door apparatus of the vehicle according to the embodiment.

As illustrated in FIG. 2, the slide door 4 includes a door handle 10 (an outside door handle and an inside door handle) with which the opening and closing operation of the slide door 4 is performed. The slide door 4 is provided with a lock apparatus 11 including a fully close lock 11a restraining the slide door 4 at a fully closed position and a fully open lock 11b restraining the slide door 4 at a fully open position. The lock apparatus 11 is connected to the door handle 10 via a remote controller 12.

At the slide door 4, when the door handle 10 is operated, the restrained state established by the lock apparatus 11 is released. Also, the slide door 4 is configured to be manually operated to open and close with the door handle 10 serving as a holding portion or a grip portion. The slide door 4 may be configured such that the restrained state established by the lock apparatus 11 is released when an operation switch or a portable device which are provided in a vehicle cabin is operated, for example.

The slide door 4 includes a door actuator 21 of which a drive source is a motor 20. The motor 20 of the door actuator 21 is supplied with driving electric power from a door ECU 22 (i.e., an example of a control apparatus controlling an opening and closing member for a vehicle), and thus rotates. That is, the door ECU 22 controls the door actuator 21 via the supply of the driving electric power to the motor 20. A power slide door apparatus 30 which can operate the slide door 4 to open and close in accordance with a driving force of the motor 20 is configured on the vehicle 1.

The door actuator 21 includes an opening and closing driving portion 31 driving the slide door 4 to open and close via a drive cable according to the driving force of the motor 20. The door actuator 21 includes a pulse sensor 32 outputting a pulse signal Sp synchronized with actions of the opening and closing driving portion 31. The door ECU 22 detects a moving position X and a moving speed Vdr of the slide door 4 actuated by the door actuator 21, on the basis of pulse output of the pulse sensor 32.

The door ECU 22 is inputted with an output signal (operation signal S1) of a first operation portion 33 provided, for example, at the door handle 10, in the vehicle cabin or a portable device. The door ECU 22 is inputted with an output signal (switch signal S2) of a second operation portion 34 provided around a driver seat, including a center console. The first operation portion 33 is operated by a user when starting an automatic opening and closing operation which will be described later. The second operation portion 34 is operated by the user for the purpose of choosing which of the automatic opening and closing operation and an assist opening and closing operation (that will be described later) is to be operated. The door ECU 22 controls the door actuator 21 on the basis of the operation signal S1 and the switch signal S2.

Figure 3:
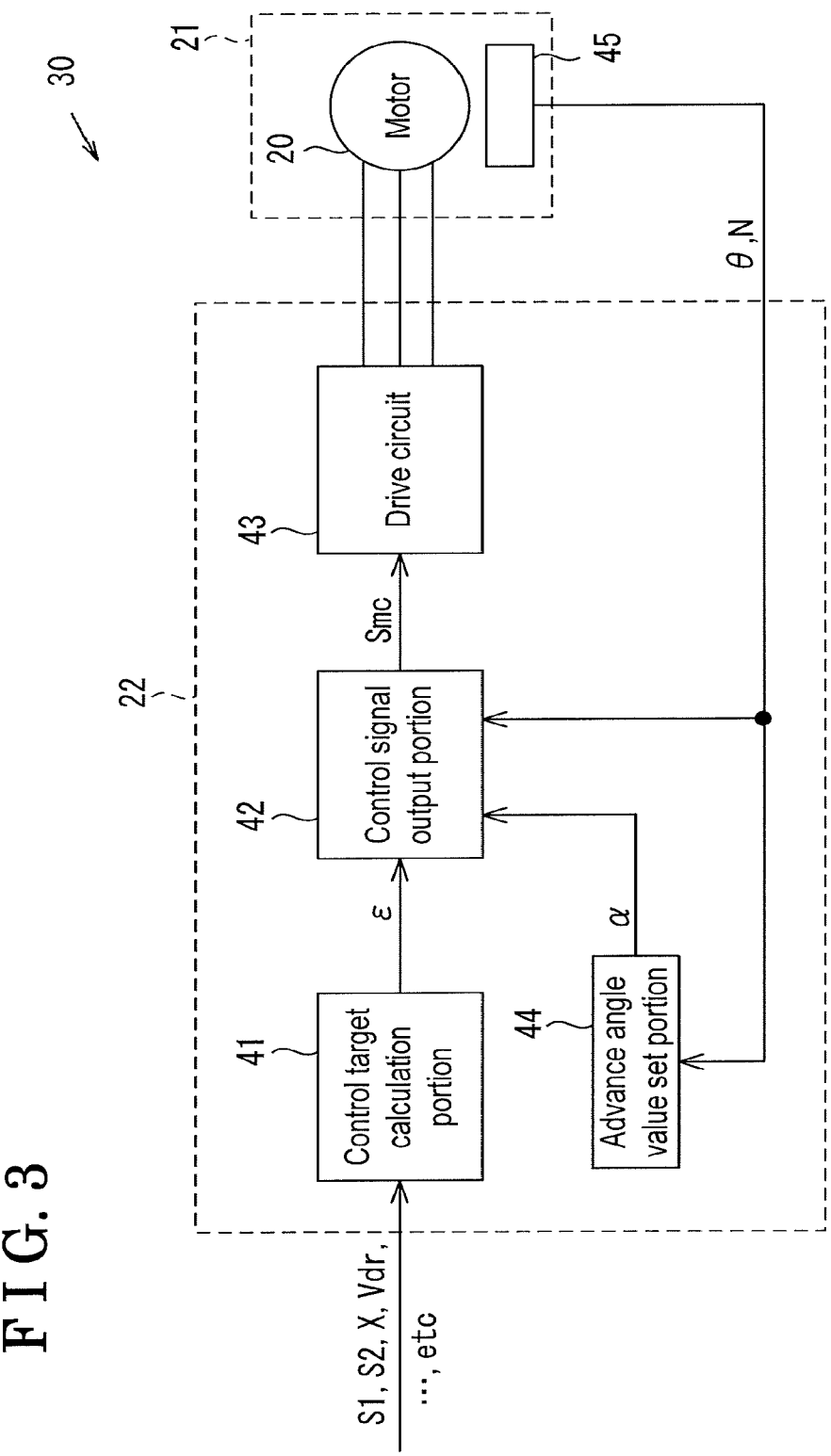
FIG. 3 is a block diagram illustrating a control configuration of the power slide door apparatus according to the embodiment.

As illustrated in FIG. 3, the door ECU 22 includes a control target calculation portion 41 calculating a control target ε of the motor 20, and a control signal output portion 42 outputting, in accordance with the control target ε, a motor control signal Smc. The door ECU 22 includes a drive circuit 43 outputting, in accordance with the motor control signal Smc, the driving electric power to the motor 20. The door ECU 22 includes an advance angle value set portion 44 setting an advance angle value α for advancing a phase of the motor control signal Smc.

The control target calculation portion 41 calculates the control target ε of the motor 20 on the basis of the operation signal S1 indicating an operation request of the user, the moving position X of the slide door 4 and the moving speed Vdr of the slide door 4, and various vehicle status quantities including a vehicle speed. The control target ε indicates a rotational direction of the motor 20 and a duty ratio (on-duty ratio) of the motor 20. A brushless motor may be used as the motor 20, and a rotational angle (electrical angle) θ of the motor 20 which is detected by a rotational angle sensor 45 is inputted to the control signal output portion 42. The control signal output portion 42 outputs the motor control signal Smc of which the phase changes according to the rotational angle θ of the motor 20.

As the drive circuit 43, a known PWM inverter configured by plural switching elements (FET: Field effect transistor) connected to each other to form a bridge shape is used. Thus, the motor control signal Smc is a PWM control signal regulating a combination of on/off patterns according to the rotational angle θ of the motor 20 and an on/off timing corresponding to the on-duty ratio indicated by the control target ε outputted by the control target calculation portion 41, in regard to the switching elements of the drive circuit 43. In the above-described manner, the drive circuit 43 outputs the three-phase (U, V, W) driving electric power to the motor 20.

The advance angle value set portion 44 outputs the advance angle value α to the control signal output portion 42. The advance angle value α is set on the basis of the switch signal S2 from the second operation portion 34 and a rotational speed N of the motor 20. The door ECU 22 provides the motor 20 with the driving electric power with the use of the motor control signal Smc of which the phase has been advanced by the advance angle value α. In the description which will be made hereafter, the driving of the motor 20 with the motor control signal Smc whose phase is advanced by the advance angle value α is referred to also as "advance control".

Figure 4:
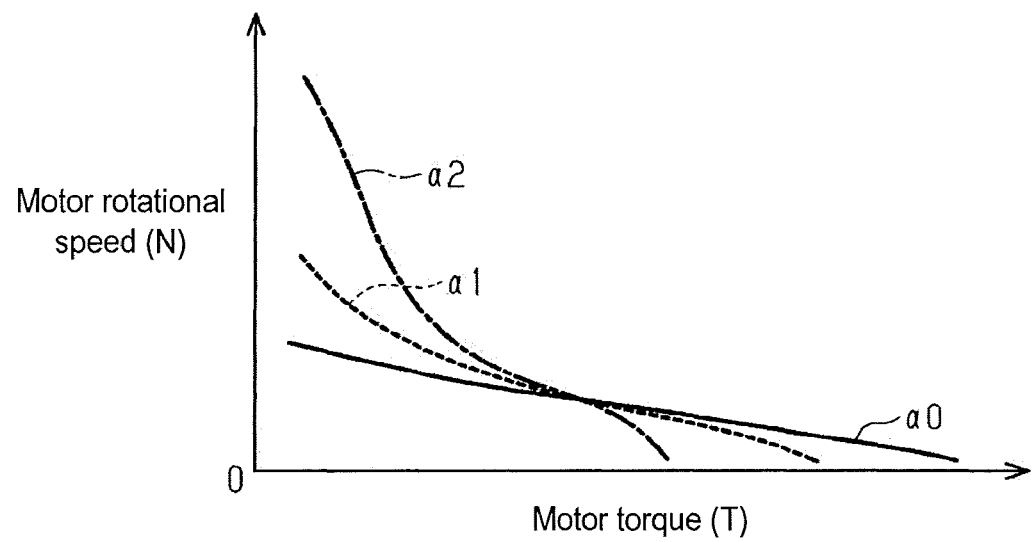
FIG. 4 is a graph indicating N-T characteristics of a motor in a case where advance angle values are different, according to the embodiment.

Next, changes in N-T characteristics of the motor 20 due to the advance control will be described with reference to FIG. 4. FIG. 4 illustrates the N-T characteristics of the motor 20 with the different advance angle values α. In FIG. 4, the N-T characteristic of the motor 20 in a case where the advance angle value α is a zeroth (0th) advance angle value α0 is indicated with the solid line, the N-T characteristic of the motor 20 in a case where the advance angle value α is a first advance angle value α1 is indicated with the dashed line, and the N-T characteristic of the motor 20 in a case where the advance angle value α is a second advance angle value α2 is indicated with the long dashed short dashed line. Because the zeroth advance angle value α0 is "0 (zero)", the case in which the advance angle value α is the zeroth advance angle value α0 can be considered also as a case in which the advance control is not performed. The first advance angle value α1 is larger than the zeroth advance angle value α0. The second advance angle value α2 is larger than the first advance angle value α1.

As illustrated in FIG. 4, a speed-increasing operation of the motor 20 due to the execution of the advance control becomes more remarkable as the advance angle value α becomes larger. That is, when a case in which the advance control is not executed is used as a reference, the N-T characteristic of the motor 20 changes to a type of high-rotations and low-torque as the advance angle value α becomes larger.

Accordingly, the door ECU 22 sets the advance angle value α to a small value when the N-T characteristic of the motor 20 needs to be low rotations and high torque. The door ECU 22 sets the advance angle value α to a large value when the N-T characteristic of the motor 20 needs to be high rotations and low torque. A relation between the advance angle value α of the advance control and the N-T characteristic of the motor 20 may be grasped by, for example, an experiment or a simulation.

Next, the opening and closing operation of the slide door 4 performed by the door ECU 22 will be described. As described above, the door ECU 22 drives the door actuator 21 and thus causes the slide door 4 to be operated for opening and closing. In detail, the door ECU 22 performs the automatic opening and closing operation which causes the slide door 4 to open and close automatically with the driving force of the motor 20, and the assist opening and closing operation which causes the slide door 4 to open and close in such a manner that the driving force of the motor 20 assists a manual operation force of the user. In the embodiment, the door ECU 22 performs the automatic opening and closing operation in a case where the switch signal S2 is being inputted from the second operation portion 34 and the door ECU 22 performs the assist opening and closing operation in a case where the switch signal S2 is not being inputted from the second operation portion 34. The manual operation force is a force that the user applies to the slide door 4 via the door handle 10 to operate the slide door 4 to open and close.

The automatic opening and closing operation operates the slide door 4 to open and close at a relatively low speed with the use only of the driving force of the motor 20, and accordingly the N-T characteristic of the motor 20 which is required at the automatic opening and closing operation corresponds to the N-T characteristics of the low-rotations and high-torque. On the other hand, the assist opening and closing operation operates the slide door 4 to open and close at a relatively high speed with the manual operation force applied by the user and the driving force of the motor 20, and accordingly the N-T characteristic of the motor 20 which is required at the assist opening and closing operation corresponds to the N-T characteristics of the high-rotations and low-torque. In this case, the motor 20 might not be able to output the torque needed for the automatic opening and closing operation only by increasing the on-duty ratio of the motor 20, or the motor 20 might not be able to rotate at the rotational speed N needed for the assist opening and closing operation.

Therefore, when the assist opening and closing operation is performed, the advance angle value set portion 44 (door ECU 22) sets the advance angle value $\alpha$ which is for advancing the phase of the motor control signal Smc more compared to when the automatic opening and closing operation is performed. In detail, the advance angle value set portion 44 does not set the advance angle value $\alpha$ when the automatic opening and closing operation is performed, while the advance angle value set portion 44 sets the advance angle value $\alpha$ which is larger than 0 (zero) when the assist opening and closing operation is performed. In other words, the advance angle value set portion 44 sets the advance angle value $\alpha$ at 0 (zero) at the automatic opening and closing operation.

The moving speed Vdr of the slide door 4, that is, the rotational speed N of the motor 20, might become large depending on magnitude of the manual operation force of the user during the assist opening and closing operation. In this case, the rotational speed N of the motor 20 may not be made to be the rotational speed N which corresponds to the moving speed Vdr of the slide door 4 only by increasing the on-duty ratio. Therefore, at the assist opening and closing operation, the door ECU 22 changes the advance angle value $\alpha$ on the basis of the moving speed of the slide door 4. In detail, the advance angle value set portion 44 chooses the advance angle value $\alpha$ on the basis of the map indicated in FIG. 5.

Figure 5:
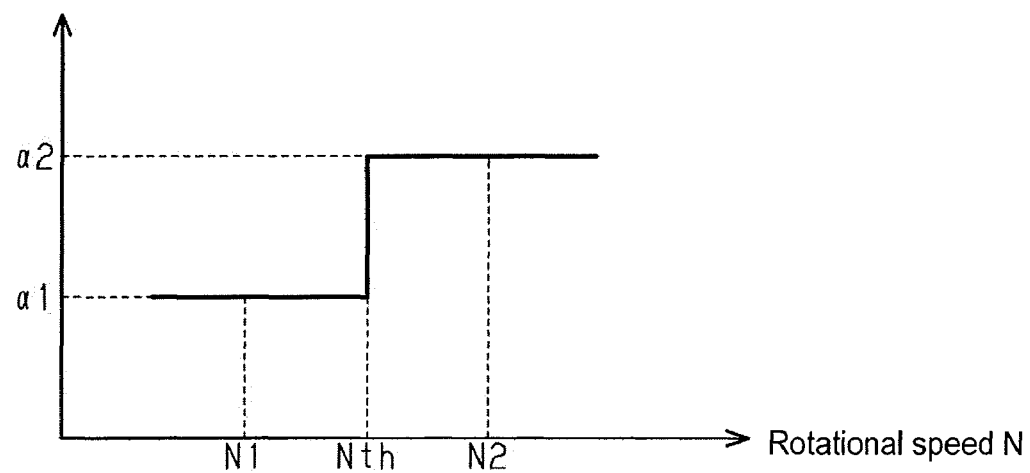
FIG. 5 is a map for setting the advance angle value according to a rotational speed of the motor, according to the embodiment.

FIG. 5 illustrates the map for setting the advance angle value $\alpha$ in accordance with the rotational speed N of the motor 20. As illustrated in FIG. 5, the advance angle value $\alpha$ is the first advance angle value $\alpha 1$ when the rotational speed N of the motor 20 is a first rotational speed N1, and the advance angle value $\alpha$ is the second advance angle value $\alpha 2$ when the rotational speed N of the motor 20 is a second rotational speed N2 that is larger than the first rotational speed N1. The first advance angle value $\alpha 1$ is set to be smaller than the second advance angle value $\alpha 2$. In other words, the advance angle value $\alpha$ is set at the first advance angle value $\alpha 1$ when the rotational speed N of the motor 20 is less than a predetermined or pre-set determination rotational speed Nth. The advance angle value $\alpha$ is set at the second advance angle value $\alpha 2$ when the rotational speed N of the motor 20 is equal to or larger than the predetermined determination rotational speed Nth.

Next, processing executed by the door ECU 22 to perform the automatic opening and closing operation and the assist opening and closing operation will be described with reference to the flowchart illustrated in FIG. 6. As illustrated in FIG. 6, the door ECU 22 determines whether or not the switch signal S2 from the second operation portion 34 is inputted (Step S11). If the switch signal S2 is inputted from the second operation portion 34 (Step S11: YES), the door ECU 22 determines whether or not a start condition of the automatic opening and closing operation is met (Step S12). The start condition of the automatic opening and closing operation may be a condition which is met when the operation signal S1 is inputted from the first operation portion 33, for example. If the start condition of the automatic opening and closing operation is not met (Step S12: NO), the door ECU 22 ends the processing.

On the other hand, if the start condition of the automatic opening and closing operation is met (Step S12: YES), the door ECU 22 performs the automatic opening and closing operation (Step S13). That is, the door ECU 22 drives the motor 20 of the door actuator 21 without performing the advance control, and causes the slide door 4 to perform the opening operation and the closing operation automatically. Subsequently, the door ECU 22 determines whether or not an end condition of the automatic opening and closing operation is met (Step S14). For example, the end condition of the automatic opening and closing operation may be a condition which is met when a signal for stopping the slide door 4 is inputted from the first operation portion 33, a condition which is met when the slide door 4 is positioned at the fully closed position or the fully open position, and/or a condition which is met when the slide door 4 is in contact with an obstacle.

If the end condition of the automatic opening and closing operation is not met (Step S14: NO), the door ECU 22 moves the processing to Step S13. To the contrary, if the end condition of the automatic opening and closing operation is met (Step S14: YES), the door ECU 22 stops the motor 20 of the actuator 21 and ends the processing.

If the switch signal S2 is not inputted from the second operation portion 34 in Step S11 (Step S11: NO), the door ECU 22 determines whether or not a start condition of the assist opening and closing operation is met (Step S15). For example, the start condition of the assist opening and closing operation may be a condition which is met when the moving speed Vdr of the slide door 4 is equal to or larger than a predetermined determination speed. If the start condition of the assist opening and closing operation is not met (Step S15: NO), the door ECU 22 ends the processing.

On the other hand, if the start condition of the assist opening and closing operation is met (Step S15: YES), the door ECU 22 obtains the rotational speed N of the motor 20

(Step S16). Next, the door ECU 22 refers to the map illustrated in FIG. 5 and sets the advance angle value α which is in accordance with the rotational speed N of the motor 20 that is obtained at Step S16 (Step S17). Then, the door ECU 22 performs the assist opening and closing operation (Step S18). That is, the door ECU 22 drives the motor 20 of the door actuator 21 by the advance control. In the above-described manner, the door ECU 22 assists the manual operation force of the user with the driving force of the motor 20, and causes the slide door 4 to perform the opening operation and the closing operation.

Subsequently, the door ECU 22 determines whether or not an end condition of the assist opening and closing operation is met (Step S19). The end condition of the assist opening and closing operation may be a condition which is met in a case where the slide door 4 is at a predetermined position including the fully open position or the fully closed position, and a case where the user stopped operating the slide door 4, for example. More specifically, the door ECU 22 may determine that the user's operation of the slide door 4 has stopped on the basis of a decrease in the rotational speed N of the motor 20 which is associated with the decrease in the manual operation force, or on the basis of an increase in a load of the motor 20 which is associated with the user's attempt to stop the opening and closing operation of the slide door 4.

If the end condition of the assist opening and closing operation is not met (Step S19: NO), the door ECU 22 moves the processing to Step S16. To the contrary, if the end condition of the assist opening and closing operation is met (Step S19: YES), the door ECU 22 stops the motor 20 of the door actuator 21 and ends the processing.

Operations and effects of the embodiment will be described. (1) When the assist opening and closing operation is performed, the door ECU 22 makes the phase of the motor control signal Smc more advanced than when the automatic opening and closing operation is performed. Thus, the door ECU 22 allows the characteristic of the motor 20 to be the N-T characteristic including the low rotations and high torque at the automatic opening and closing operation, and allows the characteristic of the motor 20 to be the N-T characteristic including the high rotations and low torque at the assist opening and closing operation. Without adopting the motor 20 including a high performance, the door ECU 22 can perform the automatic opening and closing operation and the assist opening and closing operation, in which the speeds Vdr of the slide door 4 differ from each other. Consequently, the door ECU 22 is not easily affected by the performance of the motor 20 when performing the automatic opening and closing operation and the assist opening and closing operation.

(2) The door ECU 22 does not set the advance angle value α at the automatic opening and closing operation, while the door ECU 22 sets the advance angle value α at a value which is larger than 0 (zero) at the assist opening and closing operation. Thus, the door ECU 22 can easily switch between the N-T characteristic required for the automatic opening and closing operation and the N-T characteristic required for the assist opening and closing operation.

(3) When the assist opening and closing operation is performed, the moving speed Vdr of the slide door 4 might be changed by the manual operation force of the user. Since the door ECU 22 sets the advance angle value α in accordance with the rotational speed N of the motor 20 (in accordance with the moving speed Vdr of the slide door 4), the N-T characteristic of the motor 20 which is required at the assist opening and closing operation can be made more appropriate.

The embodiment can be carried out with the following changes and/or modifications. The embodiment and the following modified examples can be carried out in combination with each other without departing from a range in which technical inconsistency does not occur. The door ECU 22 may set the advance angle value α to be larger than 0 (zero) at the automatic opening and closing operation. In this case, it is ideal that the door ECU 22 sets the advance angle value α for the automatic opening and closing operation to be smaller than the advance angle value α for the assist opening and closing operation.

The door ECU 22 may set the advance angle value α at a constant value regardless of the rotational speed N of the motor 20 at the assist opening and closing operation. The map illustrated in FIG. 5 may be a map on which the advance angle value α is set relative to the rotational speed N of the motor 20 in three stages or more. The map illustrated in FIG. 5 may be a map on which the advance angle value α increases gradually as the rotational speed N increases. In this case, the map illustrated in FIG. 5 may be a map on which the advance angle value α changes linearly relative to the rotational speed N or a map on which the advance angle value α changes nonlinearly relative to the rotational speed N.

The control apparatus controlling an opening and closing member for a vehicle, which serves as the door ECU 22, may control an opening and closing operation of an opening and closing member of the vehicle 1 other than the slide door 4. For example, the opening and closing member to be controlled may be a swing door or a back door provided at a rear portion of the vehicle 1.

According to the aforementioned embodiment, the door ECU 22 (i.e., control apparatus controlling an opening and closing member for a vehicle) includes the control signal output portion 42 configured to output the motor control signal Smc. The motor control signal Smc is for supplying the driving electric power to the motor 20. The door ECU 22 includes the advance angle value set portion 44 configured to set the advance angle value α. The advance angle value α is for advancing the phase of the motor control signal Smc when the assist opening and closing operation is performed as compared to when the automatic opening and closing operation is performed. The door ECU 22 is configured to perform the automatic opening and closing operation which causes the slide door 4 (i.e., opening and closing member) the vehicle 1 to automatically open and close with the driving force of the motor 20, and the assist opening and closing operation which causes the slide door 4 to open and close in such a manner that the driving force of the motor 20 assists the manual operation force applied to the slide door 4.

According to the above-described configuration, the slide door 4 is operated to open and close with the manual operation force applied by the user and the driving force of the motor 20 when the assist opening and closing operation is performed, while the slide door 4 is operated to open and close with the driving force of the motor 20 when the automatic opening and closing operation is performed. Accordingly, the moving speed Vdr of the slide door 4 during the assist opening and closing operation is likely to be faster (higher in speed) than the moving speed Vdr of the slide door 4 at the automatic opening and closing operation. As a result, the rotational speed N of the motor 20 tends to be higher at the assist opening and closing operation than at the automatic opening and closing operation.

Therefore, the door ECU 22 including the above-described configuration makes the phase of the motor control signal Smc more advanced at the assist opening and closing operation than at the automatic opening and closing operation. Thus, the door ECU 22 allows the characteristic of the motor 20 to be the N-T characteristic (rotational speed-torque characteristic) including the low rotations and high torque at the automatic opening and closing operation, and allows the characteristic of the motor 20 to be the N-T characteristic including the high rotations and low torque at the assist opening and closing operation. Consequently, the door ECU 22 is not easily influenced by the performance of the motor 20 when performing the automatic opening and closing operation and the assist opening and closing operation.

The door ECU 22 (i.e., control apparatus controlling an opening and closing member for a vehicle) disclosed here is not easily affected by the performance of the motor 20 when performing the automatic opening and closing operation and the assist opening and closing operation.

According to the aforementioned embodiment, the advance angle value set portion 44 sets the advance angle value $\alpha$ at the assist opening and closing operation, while the advance angle value set portion 44 does not set the advance angle value $\alpha$ at the automatic opening and closing operation.

According to the above-described configuration, the door ECU 22 does not need to set the advance angle value $\alpha$ at the automatic opening and closing operation. Thus, the door ECU 22 can switch the N-T characteristics of the motor 20 easily between at the automatic opening and closing operation and at the assist opening and closing operation.

According to the aforementioned embodiment, at the assist opening and closing operation, in a case where the moving speed Vdr of the slide door 4 is large, the advance angle value set portion 44 sets the advance angle value $\alpha$ to be larger as compared to a case where the moving speed Vdr of the slide door 4 is small.

When the assist opening and closing operation is performed, the moving speed Vdr of the slide door 4 might change depending on the magnitude of the manual operation force of the user. In this respect, the door ECU 22 including the above-described configuration sets the advance angle value $\alpha$ according to the speed of the slide door 4. Consequently, the N-T characteristic of the motor 20 which is required at the assist opening and closing operation can be made more appropriate.

According to the aforementioned embodiment, the door ECU 22 is configured to obtain the rotational speed N of the motor 20, and the advance angle value $\alpha$ is set at the first advance angle value $\alpha 1$ in a case where the rotational speed N of the motor 20 is less than the predetermined determination rotational speed Nth and the advance angle value $\alpha$ is set at the second advance angle value $\alpha 2$ which is larger than the first advance angle value $\alpha 1$ in a case where the rotational speed N of the motor 20 is equal to or larger than the predetermined determination rotational speed Nth.

According to the above-described configuration, the door ECU 22 sets the advance angle value $\alpha$ in accordance with the rotational speed N of the motor 20. Consequently, the N-T characteristic of the motor 20 which is required at the assist opening and closing operation can be made more appropriate.

A door ECU 22 (i.e., a control apparatus controlling an opening and closing member for a vehicle) includes an operation control portion configured to perform an automatic opening and closing operation which causes a slide door 4 (i.e., an opening and closing member) of a vehicle 1 to automatically open and close with driving force of a motor 20 and an assist opening and closing operation which causes the slide door 4 to open and close in such a manner that the driving force of the motor 20 assists a manual operation force applied to the slide door 4, a control signal output portion 42 configured to output a motor control signal Smc which is for supplying driving electric power to the motor 20, and an advance angle value set portion 44 configured to set an advance angle value $\alpha$ which is for advancing a phase of the motor control signal Smc when the assist opening and closing operation is performed as compared to when the automatic opening and closing operation is performed.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A control apparatus controlling an opening and closing member for a vehicle, the control apparatus comprising:
    an electronic control unit (ECU) configured to:
    output a motor control signal, the motor control signal being for supplying driving electric power to a motor;
    set an advance angle value, the advance angle value being for advancing a phase of the motor control signal when an assist opening and closing operation is performed as compared to when an automatic opening and closing operation is performed; and
    perform the automatic opening and closing operation, which causes the opening and closing member of the vehicle to automatically open and close with driving force of the motor, and the assist opening and closing operation, which causes the opening and closing member to open and close in such a manner that the driving force of the motor assists a manual operation force applied to the opening and closing member,
    wherein, at the assist opening and closing operation, in a case where a moving speed of the opening and closing member is large, the ECU is configured to set the advance angle value to be larger as compared to a case where the moving speed of the opening and closing member is small.

2. The control apparatus controlling an opening and closing member for a vehicle according to claim 1, wherein the ECU is configured to set the advance angle value at the assist opening and closing operation while the ECU is configured to not set the advance angle value at the automatic opening and closing operation.

3. The control apparatus controlling an opening and closing member for a vehicle according to claim 1, wherein
    the ECU is configured to obtain a rotational speed of the motor, and
    the advance angle value is set at a first advance angle value in a case where the rotational speed of the motor is less than a predetermined determination rotational speed and the advance angle value is set at a second advance angle value which is larger than the first advance angle value in a case where the rotational speed of the motor is equal to or larger than the predetermined determination rotational speed.

4. The control apparatus controlling an opening and closing member for a vehicle according to claim 2, wherein the ECU is configured to obtain a rotational speed of the motor, and the advance angle value is set at a first advance angle value in a case where the rotational speed of the motor is less than a predetermined determination rotational speed and the advance angle value is set at a second advance angle value which is larger than the first advance angle value in a case where the rotational speed of the motor is equal to or larger than the predetermined determination rotational speed.

\* \* \* \* \*